United States Patent [19]

Gamache et al.

[11] Patent Number: 5,196,152
[45] Date of Patent: Mar. 23, 1993

[54] REACTION INJECTION MOLDING METHOD WITH INTERNAL FRAME AND SHEAR EDGE

[75] Inventors: Ronald R. Gamache, Northford, Conn.; Douglas P. Waszeciak, Lake Jackson, Tex.

[73] Assignee: The Dow Chemical Company, Midland, Mich.

[21] Appl. No.: 698,623

[22] Filed: May 10, 1991

Related U.S. Application Data

[62] Division of Ser. No. 453,426, Dec. 12, 1989, Pat. No. 5,040,962.

[51] Int. Cl.$^5$ .............................................. B29C 45/14
[52] U.S. Cl. ..................................... 264/163; 264/257; 264/328.6
[58] Field of Search ............... 264/257, 258, 154, 155, 264/156, 328.6, 160, 267, 163, 102; 435/111, 112, 292

[56] References Cited

U.S. PATENT DOCUMENTS

| | | | |
|---|---|---|---|
| 3,041,669 | 7/1962 | Marshall et al. | 425/292 |
| 3,357,053 | 12/1967 | Lyon et al. | 425/292 |
| 3,822,161 | 7/1974 | Haase | 264/163 |
| 4,216,184 | 8/1980 | Thomas | 425/112 |
| 4,269,579 | 5/1981 | Thomas | 425/111 |
| 4,466,934 | 8/1984 | Cane et al. | 264/163 |
| 4,755,129 | 7/1988 | Baker et al. | 425/292 |
| 4,810,444 | 3/1989 | Alberino et al. | 264/102 |
| 4,830,599 | 5/1989 | Okasaka et al. | 425/412 |
| 4,917,902 | 4/1990 | Slocum et al. | 425/553 |
| 4,940,557 | 7/1990 | Kimaya | 425/112 |
| 4,986,948 | 1/1991 | Komiya et al. | 264/257 |
| 5,085,571 | 2/1992 | Congleton | 425/292 |

FOREIGN PATENT DOCUMENTS

| | | | |
|---|---|---|---|
| 47-25460 | 7/1972 | Japan | 425/416 |
| 61-118221 | 6/1986 | Japan | 425/416 |

Primary Examiner—Jay H. Woo
Assistant Examiner—Robert B. Davis

[57] ABSTRACT

A female die part has an upwardly opening die cavity for receiving a male die plunger, a supporting surface around the cavity for a porous batt of fiberous reinforcing material overlying the cavity, and a first shearing edge defining the periphery of the opening for the cavity. Peripheral portions of the batt are clamped to the supporting surface, whereupon the die plunger presses portions of the batt into a mold formed between the male plunger and the sidewalls of the cavity to completely fill the mold. A cutter having a second shearing edge cooperates with the first shearing edge to shear peripheral portions of the batt from the portions overlying the die cavity. The shearing edges in cooperation with the die plunger seal the mold to enable injection of reactive chemicals that impregnate the porous batt within the mold.

4 Claims, 5 Drawing Sheets

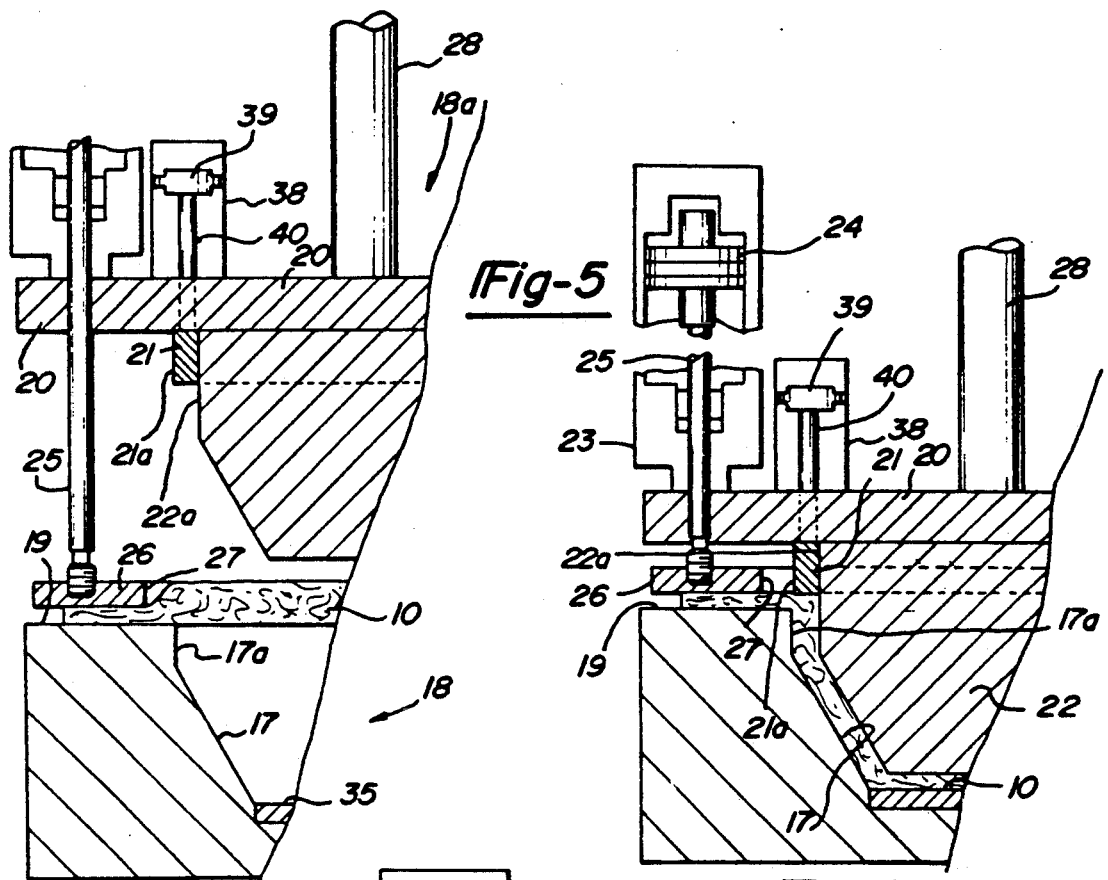
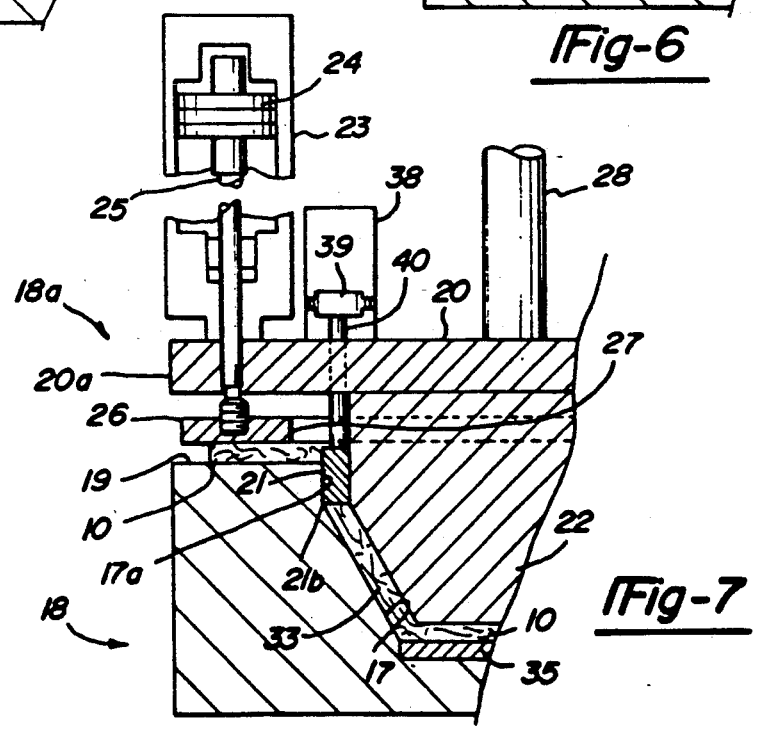

REACTION INJECTION MOLDING METHOD WITH INTERNAL FRAME AND SHEAR EDGE

This is a divisional of copending application Ser. No. 07/453,426 filed on Dec. 12, 1989 now U.S. Pat. No. 5,040,962.

This invention relates to improvements in a reaction injection molding (RIM) apparatus and to a single step process for forming a fiber reinforced article using such apparatus.

BACKGROUND OF THE INVENTION

It has long been customary in the reaction injection molding of fiber reinforced articles to place a preformed batt or mat of the fibrous material, as for example glass-fibers, in a mold and then to fill the mold with a hardenable fluid, such as a resin or a mixture of reactive chemicals, at high pressure to impregnate the fibrous mat. The fiber reinforced molded article is removed from the mold when the fluid molding chemical hardens.

The reaction injection mold apparatus of the type with which the present invention is concerned has commonly comprised a two part mold having male and female die parts. The female die part frequently has provided a horizontal partition surface extending around and defining the periphery of an upwardly opening diecavity. In that situation, the male die part has provided a horizontal peripheral partition surface essentially coextensive with the partition surface of the female die part and adapted to seat thereat in sealing relationship to effect a horizontal parting surface for the high pressure mold. The male die part has also provided a male plunger that extended below the male partition surface and projected into the die cavity to form a mold cavity configured to the shape of the article to be molded when the male and female partition surfaces were flush with each other in sealing relationship during the molding operation.

In order to provide fiber reinforced molded articles of uniform quality in production, it is important to assure that the fibrous mat completely fills the mold cavity essentially uniformly and without overlapping or extending between the partition surfaces of the male and female die parts. Otherwise such overlapping portions of the mat prevent an effective seal at the parting surface. On the other hand, if the mat does not completely fill the mold cavity, the molded article will be formed with a "resin enriched" edge or surface portion that will not be adequately reinforced by the fibrous material.

Accordingly, in the reaction injection molding of fiber reinforced articles, it has been conventional to cut one or more mats or batts of the fibrous material to a predetermined size and then stack several of the batts in layers on a preforming frame, according to the weight of reinforcing fiber required or the dimensions of the article to be molded. The fibers of the reinforcing material are usually coated with a thermoplastic binder to facilitate handling. If the binder renders the fibers comparatively stiff at room temperature, the preforming frame is placed in an oven to heat and soften the binder. Thereafter, while the layered batts are warm and readily pliable, they are transferred on the frame to a preforming die press and pressed to a desired predetermined shape to fit closely within the mold of the RIM apparatus. After the layered preformed batt cools, it is removed from the preforming frame and die press, then placed in a trimming press and trimmed to the exact desired final size required for placement in the mold of the RIM apparatus. Thus, the preformed batt will fill the RIM mold cavity uniformly without overlapping the parting surface.

The complex procedure outlined above enables the reaction injection molding of fiber reinforced articles of suitable uniformity and quality when carefully performed, but the multi-step preforming procedure is laborious, costly, and time-consuming.

SUMMARY OF THE INVENTION

In accordance with an important concept of the present invention, after the fibrous reinforcement is stacked to provide a batt of the desired weight or number of layers, and heated to soften the thermoplastic binder wherein such heating is required, the heated and pliable batt is supported on a surface (hereinafter referred to as a landing surface) of the female die half that heretofore provided the parting surface surrounding the upwardly opening die cavity, such that the batt overlaps the cavity. A fluid powered clamp is then moved to a clamping position simultaneously with the closing movement of the male and female die parts toward a molding position. At the clamping position, the portions of the batt overlapping the die cavity and supported on the landing surface are clamped tightly to the landing surface. Upon continued movement of the die parts toward the molding position, the male die plunger enters the die cavity and deforms the batt thereinto.

The die cavity provides two distinct parts comprising a lower molding portion having walls configured to form portions of the article to be molded, and an upper shearing wall that extends above the molding portion to intersect the landing surface along a sharp shearing edge that defines the periphery of the die cavity. After or shortly before the male die plunger reaches the molding position, a cutter also enters the die cavity and cooperates with the die plunger as a supplementary part thereof to deform the batt into the die cavity. The cutter may be integral with the die plunger or operated separately and is provided with a shearing edge configured to enter the upper opening of the die cavity in parallelism and in fluid sealing relationship with the shearing edge of the die cavity to shear excess portion of the batt from the portions within the die cavity and to effect a seal for the mold cavity by the time the male die plunger reaches the molding position.

Thereafter, in accordance with conventional RIM procedure, the hardenable reactive chemicals are forced into the sealed mold cavity defined by the cooperating parts of the die cavity and die plunger, so as to fill the spaces between the fibers of the batt and form a fiber reinforced molded article when the molding chemicals harden. The step of preheating the mat to soften the thermoformable binder may be eliminated in some situations, depending upon the weight of the batt and the complexity of the part to be molded, or when a thermosetting binder is employed that is not softened by heat. When the cutter is operated independently of the male die half, as for example by hydraulic means, it may cooperate with the male die plunger in pressing the fibrous material into the mold cavity and in defining a part of the latter. Also, by operating independently of the male die plunger, the cutter may positively assure that the peripheral portions of the reinforced molded article will not be "resin rich".

BRIEF DESCRIPTION OF THE DRAWINGS

FIG. 5 is a fragmentary view similar to FIG. 1, showing a modification wherein the cutter operates independently of the male die plunger.

FIGS. 6 and 7 show the male die plunger at its molding position within the female die cavity, the cutter being shown in alternative positions, prior to shearing, FIG. 6, and after shearing, FIG. 7.

It is to understood that the invention is not limited in its application to the details of construction and arrangement of parts illustrated in the accompanying drawings, since the invention is capable of embodiments and of being practiced or carried out in various ways, and that the phraseology or terminology employed herein is for the purpose of describing the invention claimed in the appended claims.

DESCRIPTION OF A PREFERRED EMBODIMENT

Figure 1:
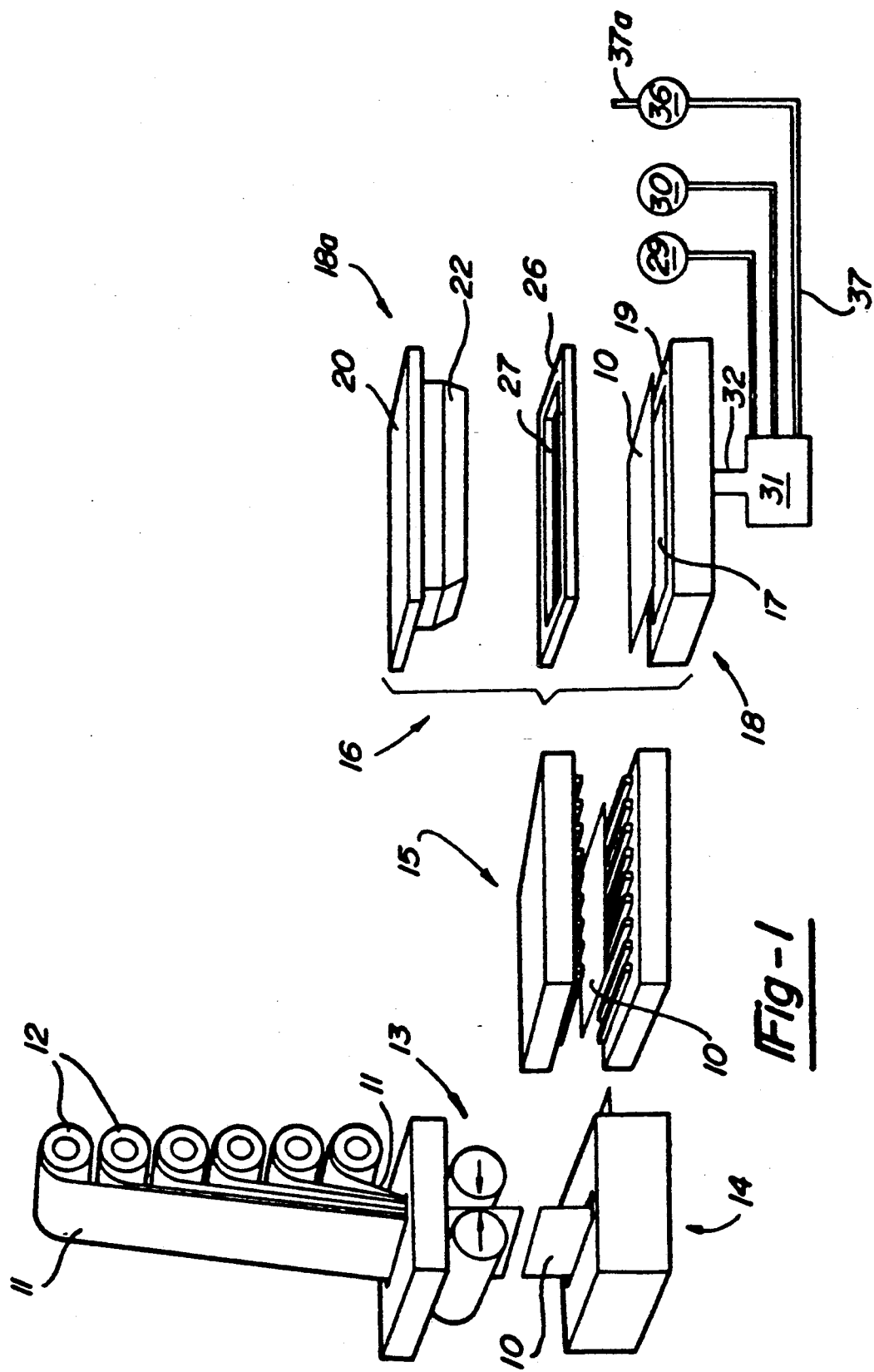
FIG. 1 is a schematic view showing apparatus for laminating and heating a fibrous batt of reinforcing material followed by transfer of the batt to a RIM apparatus embodying the present invention.

Referring to the drawings, FIG. 1 illustrates the formation of a fibrous batt 10 from a number of layers or plies 11 of reinforcing material supplied from a corresponding number of rolls 12. The material in the rolls 12 may comprise matted fibrous material, such as for example glassfibers, commonly employed to reinforce molded articles, and the layer 11 from each roll may or may not be the same in density or composition as the other layers.

The rolls 12 are arranged to laminate and supply the layers 11 to a compacter and cutter 13 that compacts the several layers 11 and cuts them to predetermined dimensions to provide the laminated batt 10 which may then be formed and impregnated with a hardenable fluid chemical to provide a reinforced article by a RIM operation in accordance with the present invention. The number of layers 11 in the batt 10 will, of course, depend upon the shape and size of the article to be reinforced, and in many instances the batt 10 may comprise a single layer.

The fibers in the various layers 11 are commonly coated with a thermoplastic binder to facilitate their handling and rolling into the rolls 12. The stiffness of the binder at room temperatures frequently requires the laminated batt 10 to be heated sufficiently to soften the binder. Accordingly, the batt 10, cut to a useful size by the compacter 13, is transferred to an automatic stacker 14 and thence to a suitable heater 15, such as an infrared heater unit, where the batt 10 is heated to between approximately 250°-300° F. to soften the binder. The heated and readily pliable batt 10 is then transferred to the RIM molding apparatus 16.

Figure 2:
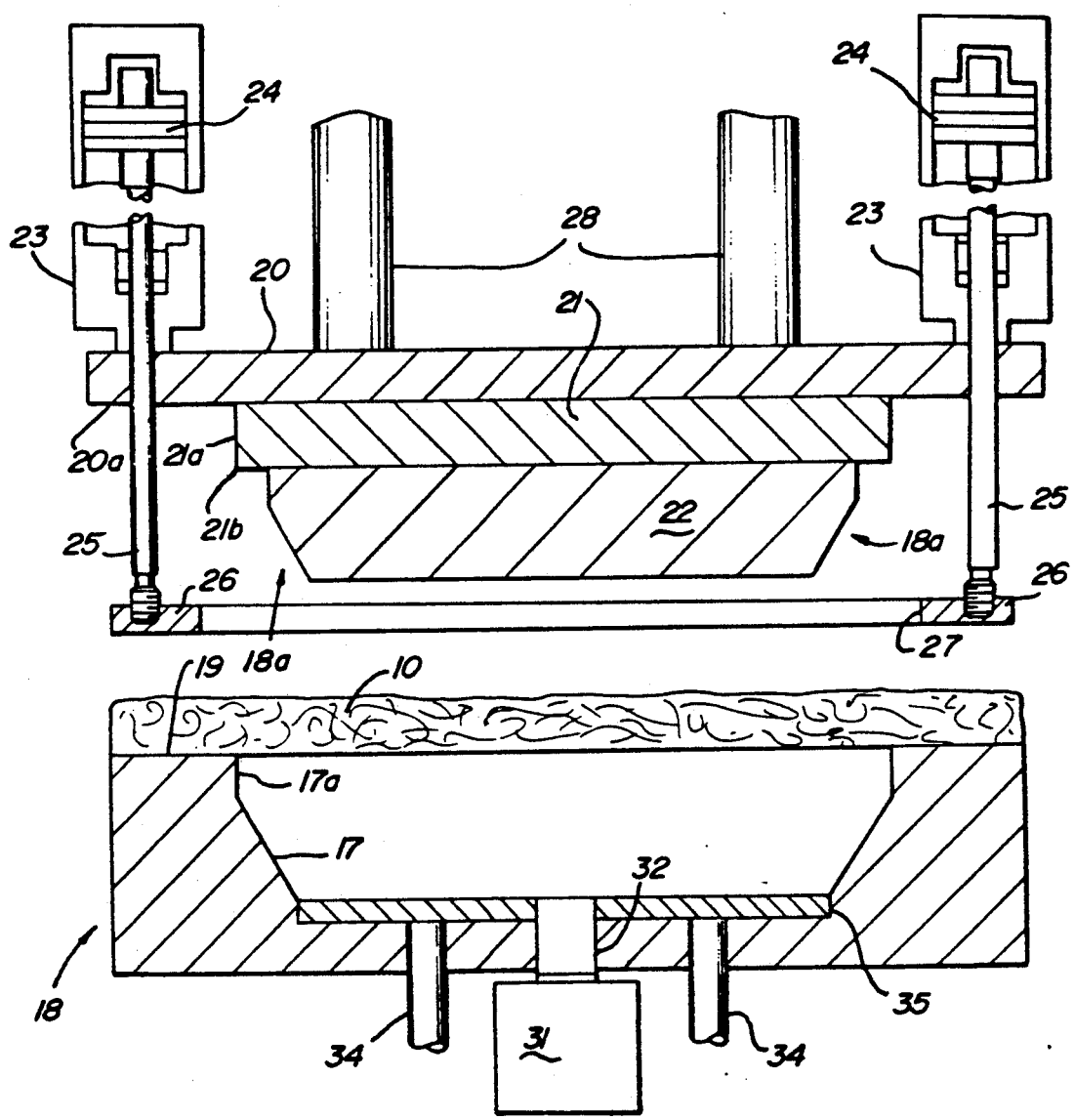
FIG. 2 is a schematic, essentially vertical midsectional view through the RIM molding apparatus of FIG. 1, showing the molding apparatus at an open position for receiving a batt of reinforcing material.

The apparatus 12-15 and associated process described thus far may be conventional and accordingly are not described in further detail. The apparatus 12-15 are commonly used to form a laminated batt 10 where such is desired as a reinforcement for the article to be molded by the apparatus 16, described in more detail below, but the batt 10 illustrated in FIGS. 2-5 may or may not be laminated or even formed with a binder. As illustrated in FIG. 2, the batt 10 of the fibrous reinforcing material, which may or may not have been preheated by the heater 15, depending upon the characteristics of the batt and the article to be molded, is laid across the opening of a mold cavity 17 of a heated female die part 18 and supported on a plane landing surface 19 that defines the periphery of the upper opening of the cavity 17.

A heated male die part 18a comprises a hydraulically actuated carrier 20 having peripheral portions 20a parallel to and coextensive with the surface 19. Secured to the carrier 20 is a cutter 21 comprising an upper part of a male die plunger 22 and having a vertical shearing edge 21a dimensioned to fit in sealing relationship within mating vertical upper wall portions 17a of the cavity 17. Secured to the underside of the cutter 21 is the lower part of the male die plunger 22 dimensioned for insertion into the cavity 17 and configured in cooperation with the cavity 17 to form the article to be molded. Also mounted on the peripheral portions of carrier 20 are a plurality of fluid actuated piston-cylinder assemblies, each comprising a cylinder 23 containing a bidirectional piston 24 having a connecting rod 25. The rod 25 extends slidably in sealing relationship through the lower end of cylinder 23 and slidably through the carrier 20 to an attachment with a clamp 26. The latter has an opening 27 dimensioned to enable passage of the shearing edge 21a and extends entirely around its opening 27 in position to confront the landing surface 19 entirely around the upper opening of the cavity 17.

Figure 3:
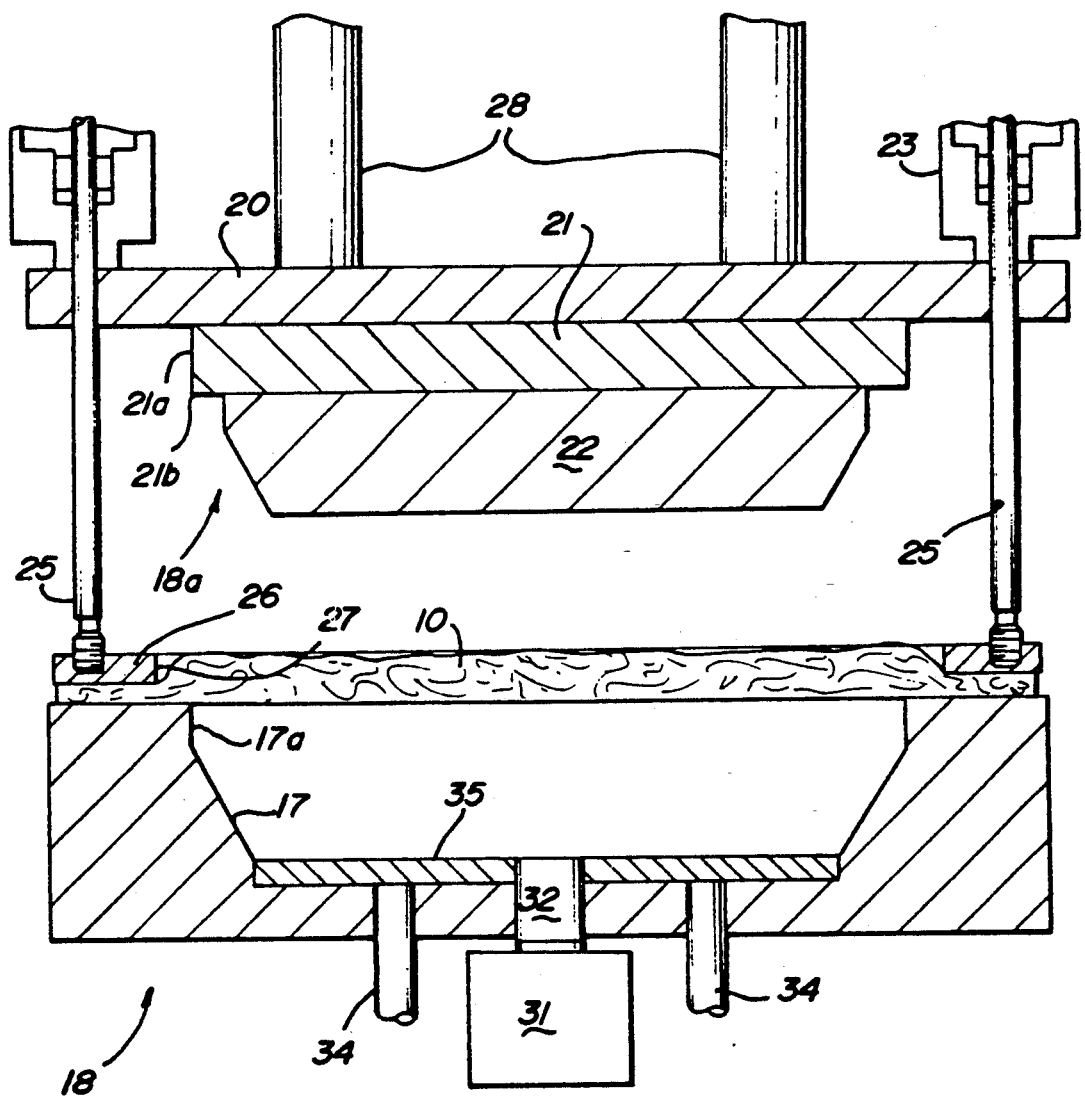
FIGS. 3 and 4 are views similar to FIG. 2, illustrating progressive stages in the operation of the molding apparatus, showing the apparatus in a clamping position, FIG. 3, and in a molding position for receiving reactive chemicals to form a fiber reinforced molded article, FIG. 4.
Figure 4:
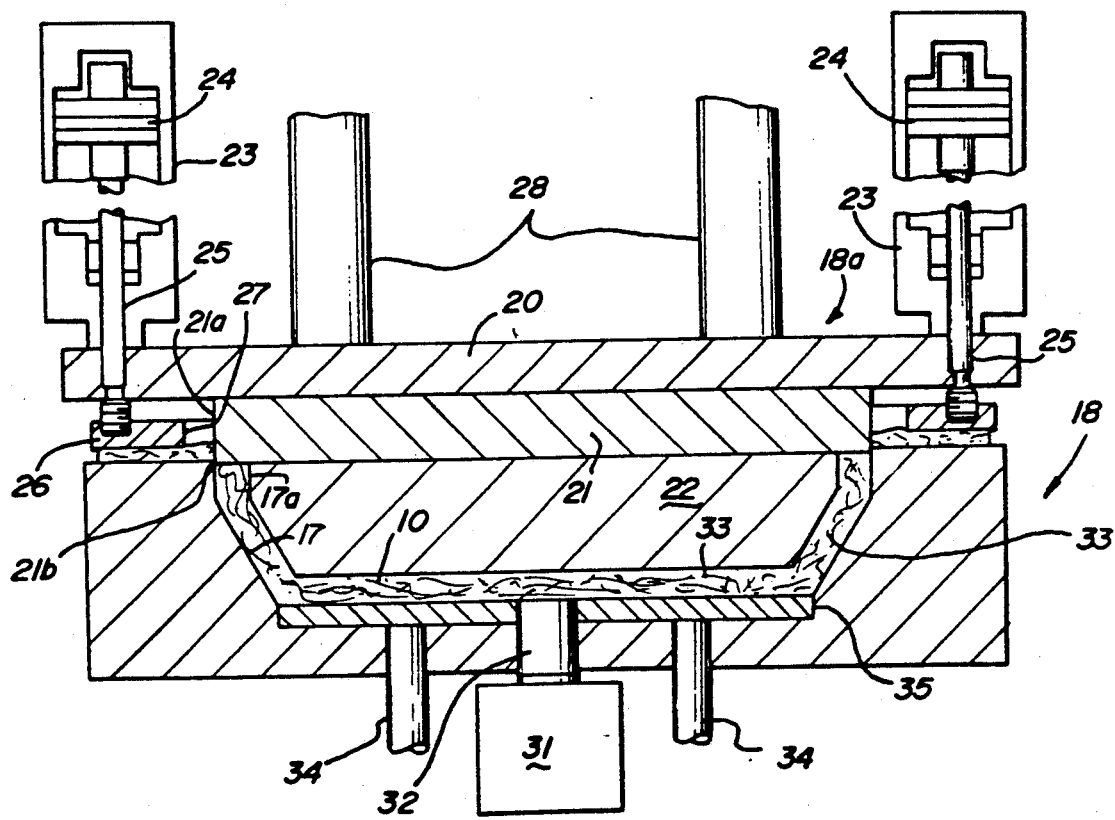

With the exception of the cutter 21, clamp 26, and the piston cylinder assemblies 23-25, the molding apparatus of FIGS. 2-4 may comprise a conventional RIM molding apparatus 16 wherein the carrier 20 may be connected by rods 28 to a bidirectional hydraulically actuated piston (not shown) for moving the carrier 20 and die plunger 22 to and from open and high pressure closed molding positions, FIGS. 1 and 4 respectively. Reservoirs 29 and 30 conventionally supply separate reactive fluid chemicals at high pressure and inject the mixed chemicals via conduit 32 into the mold cavity 17, FIG. 1.

The operating sequence involving the present invention is as follows:

When the molding apparatus is at the FIG. 1 open position, the batt 10 is supported on the landing surface 19 across the cavity 17 as described above. Thereafter the rods 28 are moved downward by conventional hydraulic operation to move the male plunger 22 to a position adjacent to and overlying the cavity 17. Simultaneously the cylinder 23 is pressurized conventionally, preferably pneumatically, to force the rods 25 and clamp 26 to the clamping position, FIG. 3, thereby to clamp the peripheral portions of the batt 10 tightly against the underlying landing surface 19. The clamping action may take place before the plunger 22 engages the batt 10, or shortly thereafter, as for example after the plunger 22 enters the cavity 17. The downward movement of the rods 28 and plunger 22 continues until the plunger 22 reaches the closed molding position, FIG. 4, at the limit of its movement within the cavity 17 and presses the batt 10 into the mold cavity 33 between the walls of the cavity 17 and plunger 22.

In the above regard, the fibers forming the batt 10 are usually not stretched as the batt is pressed into the cavity 17, FIG. 4, but the spaces between the fibers are deformed to accommodate the deformed condition of the batt 10 in the mold cavity 33, thereby to completely fill the latter. As the plunger 22 nears the end of its movement into the cavity 17, the leading end 21b of shearing edge 21a enters the cavity 17 in sealing engagement with the vertical upper wall portion 17a to effect a high pressure seal for the resulting mold cavity 33, FIG. 4, and to shear the batt 10 entirely around the edge 17a. The male die part 18a is movable vertically in the present instance, but such movement could be inclined to the vertical if undercutting of the opening of the die cavity 17 is desired. In that situation the mating sealing edges 17a, 21a would be parallel to the inclined direction of plunger movement, and if desired, the piston-cylinder assemblies 23, 24 could be supported separately from the carrier 20 so as to move the rods 25 and clamp 26 vertically as shown.

After the mold 33 is sealed by the closely interfitting surfaces 17a, 21a, the mixed reactive chemicals from the sources 29, 30, FIG. 1, are forced into the mold 33 to fill the spaces between the fibers of the mat 10. When the reactive chemicals harden, the molded article is ejected, as for example by pneumatic operation of plungers 34 connected with an ejection plate 35, defining the bottom of the mold cavity 17, to raise the plate 35 when the plunger 22 and clamp 26 are returned to the open position of FIG. 2.

The above described apparatus and procedure provide a single step RIM operation forming a batt 10 of fibrous reinforcing material and molding an article reinforced by the formed batt. The heated die parts 18, 18a are conventionally maintained at predetermined temperatures in accordance with customary RIM practice, usually between 140° F. to 200° F., depending on the requirements of the RIM operation and the reactive chemicals. The seal effected between the shear edges 17a and 21a is a relative requirement because a slight clearance amounting to approximately five thousandths of an inch is provided to allow the escape of air from the mold cavity 33 upon entry of the mixed reactive chemicals at pressures usually ranging between approximately 50 psi and 250 psi.

A small amount of the mixed chemicals may escape as flash at the seal, but such flash may be minimized by timing the duration of the injection shot into the mold cavity 33 such that only a sufficient quantity of the mixed chemicals is discharged from the head 31 to completely fill the cavity 33. Electromagnetic control of the operation of the RIM apparatus, including the mix head 31 and fluid actuation of the rods 25, 28, and 34, is accomplished conventionally by a control center 36, FIG. 1, suitably connected by electrical control cables 37 and 37a to the mix head 31 and the fluid power sources.

FIGS. 5-7 illustrate a modification wherein the cutter 21 is movable independently of the plunger 22 by means of a fluid actuated piston-cylinder assembly subject to the control center 36 via cable 37a and comprising a cylinder 38 mounted on carrier 20 and containing a bidirectional piston 39 connected to the cutter 21 by a connecting rod 40 that extends slidably and in sealing relationship through the lower end of cylinder 38 and slidably through carrier 20 to a connection with cutter 21. The upper portion of the plunger 22 is secured directly to the carrier 20. The cutter 21 extends entirely around and is sleeved on a vertical peripheral edge 22a of the plunger 22 in sliding sealing engagement therewith upon actuation of rod 40, FIG. 5. The batt 10 is laid across the cavity 17, supported on landing surface 19, and clamped by clamp 26 as described above. Upon downward movement of carrier 20 to move plunger 22 into the die cavity 17, FIG. 6, cylinders 23 and 38 also move downward. The batt 10 remains clamped by 26, and as the plunger 22 approaches the lower limit of movement at the mold closed position, the shearing edge 21a may or may not enter the opening of cavity 17 and cooperate with the shear edge 17a to shear the excess peripheral portions of the batt 10 from the portions thereof within the die cavity 17, FIG. 6, essentially as described above.

Preferably and usually the cutter 21 does not effect its shearing action until the plunger 22 moves entirely to the FIG. 7 molding position. In any event, after the shearing action, the cutter 21 may be moved downwardly an additional amount, as desired, by operation of piston 39, as for example to the FIG. 7 position. In consequence, the cutter 21 cooperates with the plunger 22 in forming the mold cavity 33. The operational versatility of the apparatus 16 is thus increased and more control over the formation of the batt 10 within the mold cavity 33 is achieved where the complexity of the resulting fiber reinforced article requires such versatility and control. In particular, a resin enriched or fiber lean peripheral portion of the molded article may be positively avoided. Likewise the length of the seal along the edges 17a and 21a may be increased, enabling a relaxation of the dimensional tolerances therebetween without decreasing the overall effectiveness of the seal. In all other respects, the operation of the apparatus in FIGS. 5-7 is the same as described in regard to FIGS. 1-6.

What is claimed is:

1. A reaction injection molding (RIM) method for forming a fiber reinforced molded article from an impregnatable batt of fibrous material having a peripheral portion around a central portion, said method comprising the steps of
   A. forming a batt of fibrous reinforcing material,
   B. providing a die part having an upwardly opening die cavity and a support surrounding the periphery of the opening of said die cavity,
   C. providing said die part with a first shearing edge defining said periphery,
   D. placing said batt across said upwardly opening die cavity and supporting peripheral portions of said batt on said support,
   E. clamping said peripheral portions of said batt to said support,
   F. providing a die plunger movable into said die cavity to form part of a mold cavity between said die plunger and the walls of said die cavity,
   G. providing a cutter extending around said die plunger and movable into said cavity independently of said die plunger to cooperate therewith to complete said mold cavity, said cutter being sleeved on said plunger in sliding sealing engagement therewith,
   H. moving said plunger into said die cavity to form said part of said mold cavity and to press portions of said batt overlying said die cavity into said part of said mold cavity, I. providing said cutter with a second shearing edge cooperable with the first shearing edge for shearing said batt at said periphery from the portions of said batt within said die cavity and for effecting a seal between said shearing edges to close said die cavity upon movement of said cutter into said die cavity, J. moving said cutter into said die cavity to effect said shearing and said seal and to form said mold cavity in cooperation with said plunger, K. injecting at high pressure a reactive fluid chemical into said mold cavity to fill the same and impregnate said fibrous batt therein with said chemical, said chemical being suitable for RIM and capable of reacting and hardening in said mold cavity to provide said article, L. allowing said chemical to react and harden to complete said fiber reinforced molded article.

2. A reaction injection molding (RIM) method for forming a fiber reinforced molded article from an impregnatable batt of fibrous material having a peripheral portion around a central portion, said method comprising the steps of:

A) providing a female die having an upwardly opening die cavity, a first shearing edge defining the periphery of the opening into said cavity, said first shearing edge also defining a first sealing surface of said die cavity extending around and terminating upwardly thereat, and a landing surface around said periphery for supporting said peripheral portion when said central portion overlies said opening;

B) placing said batt on said female die with said peripheral portion overlying said landing surface and said central portion overlying said opening;

C) providing a clamp movable to a position overlying said landing surface to clamp said peripheral portion thereto;

D) providing a male die having
  1) plunger means movable through said opening to a molding position within said die cavity to provide a mold cavity, and
  2) also having a second shearing edge cooperable with said first shearing edge to shear said peripheral portion from said central portion upon movement of said plunger means to said molding position, said second shearing edge defining a second sealing surface movable into flush sealing relationship with said first sealing surface to seal said opening of said mold cavity when said plunger means is at said molding position;

E) moving said clamp to said position overlying said landing surface and moving said plunger means into said cavity to said molding position to
  1) press said central portion into said cavity,
  2) clamp said peripheral portion against said landing surface around said periphery of said opening,
  3) shear said central portion from said peripheral portion, and
  4) form said mold cavity and fill the same with said fibrous material of said central portion;

F) employing said first and second sealing surfaces in cooperation with said plunger means at said molding position to close and seal said opening;

G) while said opening is sealed, injecting fluid chemicals at high pressure into said mold cavity to impregnate said batt with said chemicals, said chemicals being suitable for RIM and capable of reacting and hardening after injection into said mold cavity; and H) allowing said chemicals to react and harden to complete said article.

3. A method according to claim 2, wherein Step D) provides the second shearing edge as an integral unitary part of said plunger means.

4. A method according to claim 2, wherein said plunger means of said male die comprises a plunger and an independently movable cutter having said second shearing edge, and wherein, when said plunger means is moved to said molding position, said plunger is moved first into said die cavity followed by movement of said cutter to shear said peripheral portion from said central portion and then to a predetermined position within said die cavity to cooperate with said plunger to form said mold cavity and fill the same with said fibrous material of said central portion.

* * * * *